June 25, 1968  H. R. WERNER  3,390,298
ELECTRIC DISCHARGE LAMP ENVELOPE HAVING MOLTEN
INNER SURFACE AT OPERATING TEMPERATURE
Filed March 31, 1965
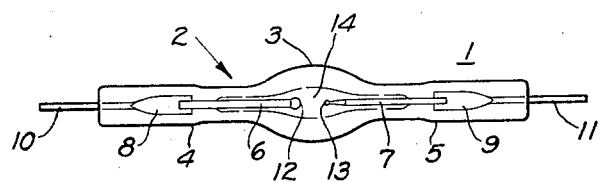
Inventor:
Horst R. Werner
by Otto Ticky
His Attorney 3,390,298
ELECTRIC DISCHARGE LAMP ENVELOPE HAVING MOLTEN INNER SURFACE AT OPERATING TEMPERATURE
Horst R. Werner, South Euclid, Ohio, assignor to General Electric Company, a corporation of New York
Filed Mar. 31, 1965, Ser. No. 444,217
7 Claims. (Cl. 313—220)

ABSTRACT OF THE DISCLOSURE

The air-cooled, thick walled, sealed vitreous silica envelope of a compact high brightness electric lamp has an inner surface consisting of boric oxide-silica glass which is molten at temperatures at which rapid devitrification of vitreous silica occurs to minimize devitrification of the envelope and retain the brightness of the lamp during operation with the inner surface of the envelope at such temperatures.

---

The present invention relates to electric lamps and particularly to such lamps having envelopes of fused vitreous silica.

Heretofore, commercial electric lamps having fused vitreous silica envelopes have been operated with the inner surface of the envelope at a temperature substantially lower than 1400° C. At temperatures in the region of 1400° C. vitreous silica devitrifies rapidly causing diffusion of the emitted light by the crystallized portion of the vitreous silica envelope and physical weakening of the envelope to quickly terminate the useful life of the lamp.

In order to avoid these disadvantages and to produce electric lamps having commercially acceptable operating lives it has been the practice heretofore to control the factors determining the temperature of the lamp envelope during operation, such as the power input and the physical dimensions of the envelope with respect to the environment in which the lamp was to be operated, so that the temperature of the envelope does not extend substantially approximately 800° C. At such envelope temperatures the vitreous silica envelope retains its strength and its transparency for a long useful life of the lamp.

While the commercial practice has been to control the factors determining the operating temperature of the vitreous silica envelopes in such manner that the envelope temperature was approximately 800° C. during lamp operation, it has been proposed heretofore to increase the temperature of the envelope during operation to a temperature of 1000° C. and higher where other considerations than long lamp life were controlling. However, as the temperature of vitreous silica is increased above approximately 900° C., devitrification increases at a substantially uniform rate with increasing temperature and at about 1400° C. the devitrification is so rapid that it destroys the useful life of even those lamps intended for use in light projection systems. In such systems a lamp life of 20 hours is acceptable since the chief consideration is the brightness of the light source and not long lamp life.

For example, in United States Patent No. 3,067,357, Fridrich, patented Dec. 4, 1962 and assigned to the assignee of this application, an electric discharge lamp capable of operation at high brightness is disclosed and claimed. The patented lamp includes a vitreous silica envelope having tungsten electrodes of small size sealed therein and containing a discharge medium including iodine vapor. The tungsten electrodes are correlated in heat-dissipating capacity to the energy loading of the device so as to operate with molten tips and the iodine vapor serves to regenerate at the electrodes metal lost therefrom. Such a lamp may be operated with the envelope at a temperature of approximately 1000° C. for a satisfactory operating life in light projection systems. In such systems the lamp envelope is exposed to the free air of the atmosphere which may be forceably circulated around the lamp envelope for cooling purposes.

A lamp of this type is capable also of operation with higher brightness when the energy input is increased and the other factors controlling the temperature of the lamp envelope are so controlled that the inner surface of the envelope is at approximately 1400° C. during operation. However, under such conditions the lamp is not satisfactory for use commercially in such systems because the fused silica envelope devitrifies at such a rapid rate with resultant diffusion of the light from the concentrated arc discharge that the lamp quickly loses its brightness.

The principal object of the present invention is to provide a transparent vitreous silica envelope for electric devices resistant to devitrification at elevated temperatures. Another object of the invention is to increase the useful life of high temperature electric devices having fused vitreous silica envelopes.

Further objects and advantages of the invention will appear from the following detailed description thereof, the accompanying drawings and the appended claims.

The present invention is based on the discovery that the above difficulty is avoided when the inner surface of the fused vitreous silica envelope of a lamp of the above and similar types is treated so as to be molten at a temperature at which rapid devitrification of vitreous silica would occur. In lamps of the type described above, for example, the inner surface of the vitreous silica envelope is so treated that it is molten at a temperature lower than 1400° C. With the inner surface of the vitreous silica envelope molten at such temperature, the lamp may be operated in such manner as to provide the desired higher brightness with a useful operating life commercially acceptable for light projecting systems and the like.

The invention will be readily understood from the following detailed description of species thereof, the accompanying drawing and the appended claims.

In the single figure of the accompanying drawing the lamp 1 illustrated is of the general type disclosed and claimed in the above Fridrich patent and comprises a generally tubular sealed envelope 2 of vitreous silica preferably of the type made by melting crystalline quartz. The envelope 2 has a generally elliptical thick wall central portion 3 provided with extensions 4 and 5 which are referred to hereafter as necks. The electrodes 6 and 7 each consist of short lengths of tungsten wire which are welded to the foliated ends 8 and 9 of molybdenum in-lead wires 10 and 11 extending along the necks, the foliated portions providing the hermetic seals with the envelope.

The illustrated lamp is intended for direct current operation and the anode 6 is rod-like and rounded at the inner end 12 while the cathode 7 includes a tapered portion which attains its smallest diameter immediately before the spherical part at its inner end 13. As taught in the aforementioned Fridrich Patent, the lamp operates with substantially molten tips at the electrode ends 12 and 13 and the spherical or rounded ends on the electrodes may be formed after completion of the lamp by operating it at a current or loading sufficient to melt back the electrode tips.

The lamp 1 contains in the discharge chamber 14 defined by envelope portion 3 an ionizable filling which includes an inert gas such as argon and a halogen, preferably iodine or a substance which releases iodine at high temperature. The iodine regenerative cycle maintains the electrodes stable in size and shape and eliminates envelope darkening.

The lamp has a smooth configuration at the thick wall, ellipsoidal central portion 3 defining chamber 14 to eliminate cool spots on the chamber wall to prevent condensation of the iodine vapor. The central ellipsoidal portion 3 is of substantial wall thickness to provide adequate strength for resisting high internal pressures during operation of the lamp. The chamber 14 contains as the basic gas filling argon at a filling pressure of approximately 50 millimeters of mercury and also a quantity of indium iodide sufficient to provide an amount of free iodine of 0.01 to 1.0 micromole per cubic centimeter of the chamber volume. The lamp envelope is exposed to the ambient atmosphere and is air cooled during operation.

Lamps of this type may be made by the method disclosed and claimed in the copending application of Elmer G. Fridrich, Ser. No. 279,270, filed May 9, 1963, titled "Electric Lamp Manufacture," which application is assigned to the assignee of the present application. In brief, the method includes inserting the electrode and in-lead wire into one of the envelope extensions and fabricating the hermetic seal thereat, then exhausting, flushing and filling the envelope through the opposite extension and thereafter fabricating the seal at that extension. This results in a tipless lamp construction highly suitable for use in light projecting systems since the usual exhaust tip is eliminated.

A lamp of the above-described structure having an overall envelope length of approximately 5 centimeters, an arc discharge gap between the inner ends 12 and 13 of the electrodes 6 and 7 of 2.5 to 3 millimeters, a maximum inner diameter at the arc chamber 14 of 0.3 centimeter, a maximum outer diameter of 1 centimeter and operated in free air at about 300 watts input operates at high brightness with the opposed tips of the electrodes in molten condition. The inner surface of the envelope defining chamber 14 is at a temperature of at least approximately 1400° C. during lamp operation. It has been found that in such a lamp devitrification of the central portion 3 defining chamber 14 of the envelope 2 usually begins before the lamp has been operated 10 hours on a 15 minute on and a 5 minute off cycle.

In lamps of this structure so operated, spots of devitrification develop in most cases first in a band on the inner surface of the fused silica envelope near the ends 12 and 13 of the electrodes. Occasionally spots break out all over the inner surface of the envelope. After approximately 12 hours of operation on the above cycle, a band of devitrification about 2 millimeters in width develops around the cathode 7 and spots of devitrification appear around the anode 6. The devitrification grows toward the center of the chamber 14 gradually obscuring the arc discharge. This results in a diffuse source of lower brightness than the arc discharge.

Devitrification does not, however, cause failure in operation of lamps of this type. Such lamps have been operated on the above cycle under the above conditions for over 50 hours and the entire inner surface of the center portion 3 has become devitrified but at the end of such period the lamps were capable of operation and the envelope was physically intact even though the center portion 3 of the envelope 2 had bulged to the extent that the diameter of the arc chamber 14 was approximately twice its original size.

In accordance with the present invention lamps of this structure wherein the inner surface of the envelope portion 3 has been treated as described below so as to be molten at the temperature existing thereat during operation of the lamp are substantially free from devitrification at the end of 24 hours of operation when operated under the above conditions on the above operating cycle. Thus, the treatment of the inner surface of this portion of the vitreous silica envelope, which does not cause any detectable difference in operation of the lamp or in the spectral distribution of the light emitted thereby, results in a lamp having a commercially useful life in light projection systems, for example, by eliminating the devitrification of the inner surface of the envelope as a lamp life limiting factor.

A treatment effective for lowering the melting temperature of the inner surface of the vitreous silica envelope portion 3 defining chamber 14 so that this surface is molten during operation of the lamp consists in first covering the surface before the lamp is made as described above with a solution which, on heating, produces a thin continuous coating of boric oxide and then heating the envelope to a temperature and for a time effective to cause an interaction between the silica at the coated surface of the envelope and the boric oxide of the applied coating to form in situ a boric oxide-silica glass on the treated surface of the envelope. The envelope then has an inner surface of boric oxide-silica glass.

Wetting the clean inner surface of the envelope portion 3 with a solution of 1 part of glycerine and 3 parts of trimethylborate and heating the envelope with the inner surface thereof so wetted to a temperature of 1200 to 1300° C., inclusive, for two hours is effective for this purpose. During the heating time the organic solvents are burned out and the resultant boric oxide interacts with the silica at the treated inner surface of the envelope to form in situ a boric oxide-silica glass layer which is molten at a temperature of 1400° C.

The thickness of the boric oxide-silica glass layer is of importance since a layer which is too thin does not provide adequate protection against devitrification and one which is too thick will easily crack with changes in temperature. A layer formed in the above manner is eminently satisfactory for preventing devitrification of the vitreous silica envelope of lamps of the above type.

The thickness of the layer may be readily determined by an analytical balance, that is, the weight gained by the envelope attributable to the added boric oxide. When the weight gain is from 0.1 to 1 milligram, inclusive, per square centimeter of the inner surface of envelope portion 3, the thickness of the layer is satisfactory.

The wetting of the inner surface of the central portion 3 of envelope 2 with the solution may be accomplished by supporting the lamp envelope in an upright position and filling its interior with the solution through one of the extensions from the bottom of the envelope and thereafter draining the envelope. The solution may then be wiped off the inner surface of the envelope extensions and the remainder air dried. Thereafter the envelope may be heated in a high temperature electric furnace while supported in contact with a material, such as platinum, which does not contaminate the coated envelope.

It will be understood, of course, that prior to the treatment described above the entire inner surface of the vitreous silica envelope is thoroughly cleaned of contaminants by washing with distilled water after washing with a solution of 5% hydrofluoric acid, 5% nitric acid.

In making lamps of the type shown in the drawing and described above, it has been found advantageous to limit the internal boric oxide-silica glass layer on the envelope to that part of the envelope defining the discharge chamber 14 to avoid difficulty at the hermetic seals of the lamp.

While the above manner of forming the lower melting point layer on the envelope is effective, it will be understood, of course, that other methods of applying the boric oxide coating onto the inner surface of the central portion 3 of envelope 2 may be used and that the coated envelope may be heat-treated by other apparatus than that disclosed above, the essential requirements being to cause a reaction between the boric oxide and the vitreous silica at the inner surface of the part of the envelope defining the discharge chamber 14 and that the weight gain of the envelope at the end of the treatment is such as to provide an effective, non-cracking layer of boric oxide-silica glass.

While the best mode of carrying out the invention has been illustrated and described herein, it will be understood that changes in the treatment of the inner surface of the envelope may be made by those skilled in the art without departure from the spirit and scope of the invention. For example, tributylborate may be used instead of trimethylborate in the disclosed solution. Vapors of trimethylborate entrained in an inert gas, such as nitrogen, may be conducted by a small fused silica tube extending through one of the extensions of the envelope into the part 3 of the envelope defining the discharge chamber 14 and this part of the envelope may be heated to about 700° C. with air also passing into the chamber to oxidize the trimethylborate and produce the boric oxide coating. Also, the envelope part 3 may be treated at its inner surface with gaseous diborane with the wall of the chamber 14 at a temperature of 600 to 1000° C. to thermally crack the diborane to form a small amount of boron which may be subsequently oxidized to boric oxide coating the wall of chamber 14. The envelope then may be heated to form the layer of boric oxide-silica glass on the envelope part 3 as disclosed above.

What I claim as new and desire to secure by Letters Patent of the United States is:

1. A compact electric device comprising a hermetically sealed thick walled envelope of vitreous silica exposed to the atmosphere, said envelope being correlated in heat-dissipating capacity to the energy loading of the device to have the inner surface thereof during normal operation of the device in free air at a temperature in the range of temperature wherein rapid devitrification of vitreous silica occurs but below the softening temperature of vitreous silica, the inner surface of said envelope consisting of boric oxide-silica glass having a melting point lower than the operating temperature of said inner surface whereby said inner surface is molten during operation of the device and devitrification of the envelope is minimized.

2. A compact electric device comprising a hermetically sealed thick walled envelope of vitreous silica exposed to the atmosphere, said envelope being correlated in heat-dissipating capacity to the energy loading of the device to have the inner surface thereof at a temperature of approximately 1400° C. during normal operation of the device in free air, the inner surface of said envelope consisting of boric oxide-silica glass formed in situ and having a melting temperature lower than 1400° C. whereby the inner surface of the envelope is molten during operation of the device and devitrification of the envelope is minimized.

3. A compact electric lamp comprising a hermetically sealed thick walled envelope of vitreous silica exposed to the atmosphere, a high temperature light source in said envelope, said envelope being correlated in heat-dissipating capacity to the energy loading of the lamp to have the inner surface thereof during normal operation of the lamp in free air at a temperature at which vitreous silica devitrifies rapidly, the inner surface of said envelope consisting of boric oxide-silica glass formed in situ and having a melting temperature lower than the operating temperature of said inner surface whereby the inner surface of the envelope is molten during operation of the lamp and devitrification of the envelope is minimized.

4. A compact gaseous electric discharge device comprising a hermetically sealed thick walled envelope of vitreous silica exposed to the atmosphere, said envelope being correlated in heat-dissipating capacity to the energy loading of the device to have the inner surface thereof during normal operation of the device in free air at a temperature in the range of temperature wherein rapid devitrification of vitreous silica occurs but below the softening temperature of vitreous silica, the inner surface of said envelope consisting of boric oxide-silica glass having a melting point lower than the operating temperature of said inner surface whereby said inner surface is molten during operation of the device and devitrification of the envelope is minimized.

5. A compact gaseous electric discharge lamp comprising a hermetically sealed thick walled envelope of vitreous silica exposed to the atmosphere, a pair of tungsten electrodes projecting into said envelope, a gaseous medium in said envelope including halogen vapor, said electrodes being correlated in heat-dissipating capacity to the energy loading of said lamp to operate with molten tips and the halogen vapor serving to regenerate at the electrodes metal lost therefrom, said envelope being correlated in heat-dissipating capacity to the energy loading of the lamp to have the inner surface thereof during normal operation of the lamp in free air at a temperature at which vitreous silica devitrifies rapidly, the inner surface of said envelope consisting of boric oxide-silica glass formed in situ and having a melting temperature lower than the operating temperature of said inner surface whereby the inner surface of the envelope is molten during operation of the lamp and devitrification of the envolpe is minimized.

6. A compact gaseous electric discharge lamp comprising a heremtically sealed thick walled envelope of vitreous silica exposed to the atmosphere, a pair of tungsten electrodes projecting into said envelope, a gaseous medium in said envelope including iodine vapor, said electrodes being correlated in heat-dissipating capacity to the energy loading of said lamp to operate with molten tips and the iodine vapor serving to regenerate at the electrodes metal lost therefrom, said envelope being correlated in heat-dissipating capacity to the energy loading of the lamp to have the inner surface thereof during normal operation of the lamp in free air at the temperature at which vitreous silica devitrifies rapidly, the inner surface of said envelope consisting of boric oxide-silica glass formed in situ and having a melting temperature lower than the operating temperature of said inner surface whereby the inner surface of the envelope is molten during operation of the lamp and devitrification of the envelope is minimized.

7. A compact gaseous electric discharge lamp as defined in claim 5 wherein the envelope has a discharge chamber defining generally ellipsoidal central portion having a wall thickness not less than the maximum inner diameter of said portion.

References Cited

UNITED STATES PATENTS

| 2,568,459 | 9/1951 | Noel | 313—220 |
| 3,067,357 | 12/1962 | Fridrich | 313—223 |

JAMES W. LAWRENCE, *Primary Examiner.*

R. JUDD, *Assistant Examiner.*